Jan. 20, 1959    A. A. MARKSON    2,870,297
TRIP THERMOSTATS HAVING SHARP REFERENCE TEMPERATURES
Filed June 24, 1957
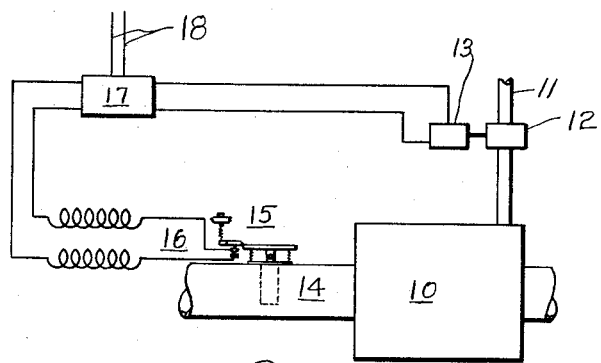
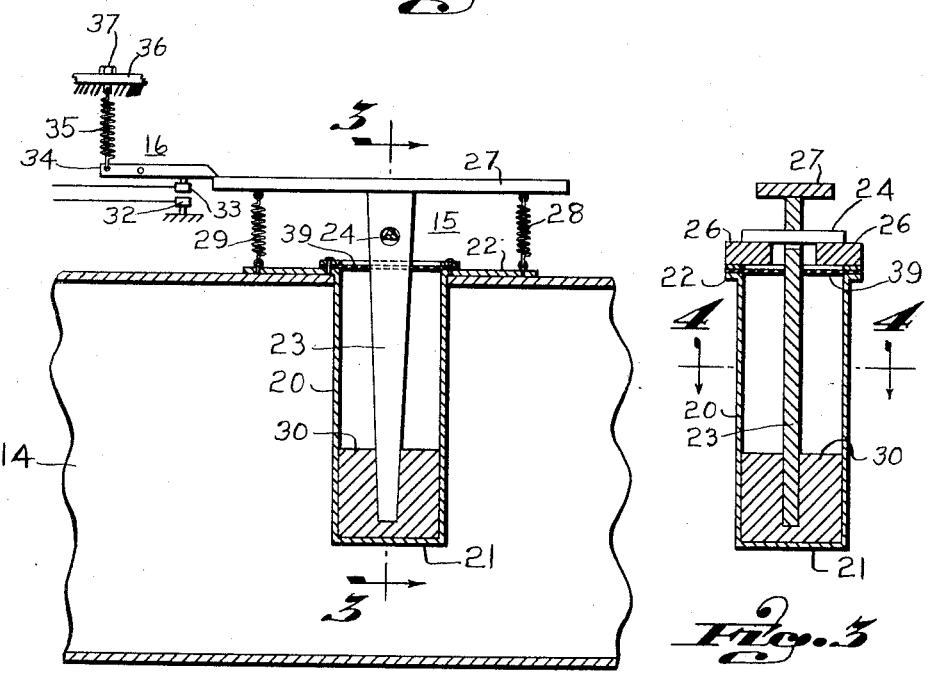
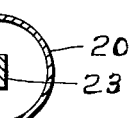
INVENTOR.
Alfred A. Markson
BY Gerald B. Tjoflat
His attorney

United States Patent Office 2,870,297
Patented Jan. 20, 1959

2,870,297

TRIP THERMOSTATS HAVING SHARP REFERENCE TEMPERATURES

Alfred A. Markson, Mount Lebanon, Pa., assignor to Hagan Chemicals & Controls, Inc., Pittsburgh, Pa., a corporation of Pennsylvania Application June 24, 1957, Serial No. 667,373

1 Claim. (Cl. 200—142)

This invention relates to temperature responsive devices and more particularly to devices that function upon the occurrence of a specific temperature, and which can be reset only after the thermal element has cooled to a lower temperature.

An object of this invention is to provide a thermostatic device provided with a thermal element having a sharp or well defined melting point, so that it will trip and actuate a signal establishing device upon the occurrence of the melting point temperature.

A further object is to provide a device as above set forth that can be provided with a selected thermal element having the precise trip temperature desired and which consists of a pure substance or an alloy of pure substances whose melting points are sharp and well defined.

A still further object is to provide a device that cannot be reset after it has tripped, until the thermal element has solidified.

The foregoing and other objects of the invention will in part be apparent and will in part be obvious to those of ordinary skill in the art to which the invention pertains, from the following description and drawings.

In the drawings:

Figure 1 is a more or less diagrammatic view of apparatus provided with a temperature responsive device arranged and constructed in accordance with an embodiment of the invention;

Fig. 2 is an enlarged view in section of a portion of the apparatus of Fig. 1 illustrating the temperature responsive device in section;

Fig. 3 is a view in section taken on line 3—3 of Fig. 2; and

Fig. 4 is a view in section taken on line 4—4 of Fig. 3.

The thermostatic device embodying the invention has many and various applications. For example, the device may be utilized to either shut off or reduce the fuel input to a gas turbine in the event the temperature of the gases in the tail pipe exceed a predetermined value. Thus, as shown in Fig. 1, a gas turbine 10 is shown having a fuel input supply pipe 11 controlled by a valve 12 and an actuator 13 which may be a solenoid for closing the valve when it is energized.

The gases exhausting from the turbine discharge into a tail pipe 14 provided with a thermostatic device 15 embodying the invention. The thermostatic device 15 includes a switch 16 in circuit with a controller 17 which in turn controls the solenoid 13. The controller 17 is provided with power supply lines 18 which furnish not only the voltage to the switch 16 but to the solenoid 13 as well, the switch 16 being in series circuit with the solenoid.

The thermostatic device 15 is shown more particularly in Figs. 2, 3 and 4. It comprises a tubular member 20 having a closed inner end 21 and a mounting flange 22 at its outer end. Within the tubular member 20 is a pendulum member 23 mounted on a fulcrum 24 supported by support blocks or ways 26 as shown in Fig. 3.

The upper end of the member 23 carries a crossbar or keeper 27. It is biased to a neutral or horizontal position by means of springs 28 and 29 disposed on either side of the fulcrum 24. The springs, as shown, are attached at their upper ends to the opposite ends of member 27 and at their lower ends to the flange 22. The member 23 is normally secured in a vertical or neutral position by means of a thermal element 30. The thermal element 30 consists of a pure substance having a sharp and well defined melting point. It may also consist of alloys of pure substances as will be described infra.

Associated with the crossbar or keeper 27 is the switch 16. It comprises relatively stationary and movable contact members 32 and 33, the latter being carried by a pivoted lever or trigger 34. One end of the trigger rests on the adjacent end of the crossbar 27, and the other end is connected by a tension spring 35 to a support 36. The tension in the spring may be adjusted by means of an adjustment 37.

When the thermal or fusible member 30 is in its solid state, the member 23 cannot move on its fulcrum in either direction. The spring 35 urges the member 34 in a direction to rock or tilt member 27 counterclockwise the moment the thermal mass or member 30 melts. When that occurs, the contact member 33 engages the contact member 32 thereby closing the alarm or control circuit above described. So long as the mass 30 is molten, the thermostatic device cannot be reset. By reset, is meant that the crossbar 27 cannot occupy its neutral position in which the switch contacts 32 and 33 are held in their separated or a non-alarm or control position.

In order that the mass 30 may not be affected by adverse atmospheres, the upper end of the member 20 is closed by a diaphragm 39 that seals the space above the mass 30. That space may also be filled with an inert gas, such as nitrogen, to protect the thermal member 30 against oxidation and also to protect it against contamination.

The thermal mass 30 may be selected according to the particular temperature condition it is required to meet. For example, if the maximum temperature to which the tail pipe 14 is to be exposed is of the order of 1200° F., a number of substances may be employed, such as pure aluminum, antimony, ferrous chloride, or barium nitrate. Alloys of lead and antimony or aluminum and zinc can also be employed. These have melting points of the order of 1100° F. Alloys of aluminum and antimony or aluminum and copper may also be employed as they melt at about 1250° F.

If the thermal element 30 is made of a pure substance, the substance may be selected from the group consisting of aluminum, antimony, sodium, magnesium, lead, sulfur, or other crystal salts. If, for example, the pipe 14 is not carrying hot gases, but is carrying instead a refrigerated medium and it is desired to prevent the temperature rising above that of the melting point of ice, ice may be employed as the mass 30.

Pure aluminum has a melting point of 1220° F.; antimony 1167° F.; ferrous chloride 1250° F.; and barium nitrate 1103° F.

Thus, according to the particular condition that the thermostatic device must meet, a mass 30 is selected which will fuse at the precise temperature required.

An advantage of using a device such as shown and described above is that it will allow or cause the control or signal mechanism to function precisely at the melting point of the thermal mass 30 and it will preclude resetting of the device until the temperature has been reduced to the point where the mass 30 solidifies. By selecting the proper mass 30 for the precise temperature required, the device may be employed in a variety of situations where the signal element of the device is required to function precisely at a predetermined temperature.

Having thus described the invention, it will be apparent to those of ordinary skill in the art that various modifications and changes may be made without departing from either the spirit or the scope of the invention.

Therefore, what is claimed as new and desired to be secured by Letters Patent is:

A thermostatic device comprising an elongate hollow member, a pivotally supported member extending into the hollow member, means yieldingly urging said pivotally supported member to a central position, said urging means comprising a keeper member secured to the pivotally supported member and having yielding means connected thereto for urging the same and the pivotally supported member to said central position, a thermal element in said hollow member in which the free end of said pivotally supported member is submerged, said thermal element comprising a substantially pure, solid substance having a sharp melting point, and a signal mechanism operatively connected to and maintained in a predetermined position by said pivotally supported member while the thermal element is solid, said signal mechanism comprising a latch member that engages the keeper member and is provided with means for rocking the keeper and the pivotally supported member when the thermal element melts, and actuating the signal mechanism to another position.

References Cited in the file of this patent

UNITED STATES PATENTS

| | | |
|---|---|---|
| 2,723,325 | Wood | Nov. 8, 1955 |
| 2,764,025 | Otto | Sept. 25, 1956 |
| 2,767,285 | Kosak | Oct. 16, 1956 |